Dec. 20, 1949  W. H. MORGAN  2,491,513
CONTINUOUSLY OPERATED PHOTOPRINTER
HAVING A SAFETY DEVICE
Filed March 12, 1946  2 Sheets-Sheet 1

INVENTOR
WILBERT H. MORGAN

Dec. 20, 1949  W. H. MORGAN  2,491,513
CONTINUOUSLY OPERATED PHOTOPRINTER
HAVING A SAFETY DEVICE
Filed March 12, 1946  2 Sheets-Sheet 2

INVENTOR
WILBERT H. MORGAN
BY
*Luther W Hawley*
ATTORNEY

Patented Dec. 20, 1949

2,491,513

UNITED STATES PATENT OFFICE 2,491,513

CONTINUOUSLY OPERATED PHOTOPRINTER
HAVING A SAFETY DEVICE

Wilbert H. Morgan, Howard Beach, N. Y.

Application March 12, 1946, Serial No. 653,836

2 Claims. (Cl. 95—73)

This invention relates to a device or to an apparatus for making photoprints.

More particularly stated, the invention relates to apparatus for making prints on sensitized paper from negatives which may consist of photographic films, negative prints, or papers to be copied, such as letters, checks, etc.

Many photoprinting machines now in use are provided with a glass plate between the light source or lamps and the negative. A platen is provided for pressing and holding the sensitized print paper in contact with the negative and for holding the negative in contact with the glass plate. It is essential for the proper and efficient operation of the apparatus or device that the negative and sensitized paper be firmly and securely held against the glass during the printing operation and that the print paper be exposed for the right length of time.

This invention has for its salient object to provide a device or an apparatus of the character described so constructed and arranged that when the apparatus is started in operation the sensitized paper and negative will be firmly and securely held during the printing operation and will be exposed for the correct length of time and thereafter be released and the source of light for the exposure will be automatically extinguished.

Another object of the invention is to provide a device of the character described having means for quickly releasing the platen from operative position in case of need.

Further objects of the invention will appear from the following specification taken in connection with the drawings which form a part of this application, and in which Fig. 1 is a vertical sectional elevation of a device constructed in accordance with the invention;

Fig. 4 is an end elevation illustrating the cam and pitman or link;

Fig. 5 is a detail elevational view illustrating the means for releasing the fulcrum of the lever in case of need.

Figure 1:
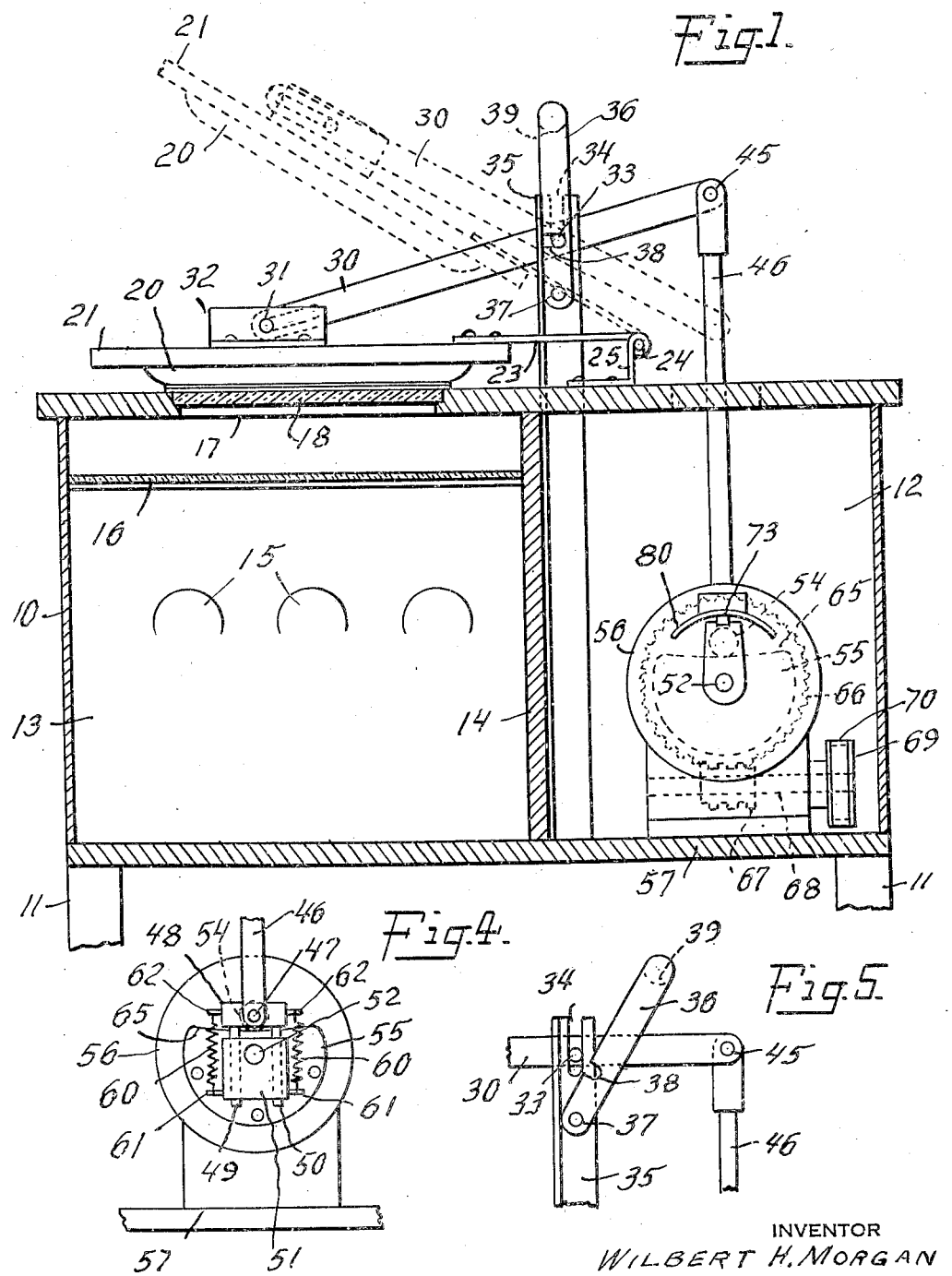
Figure 2:
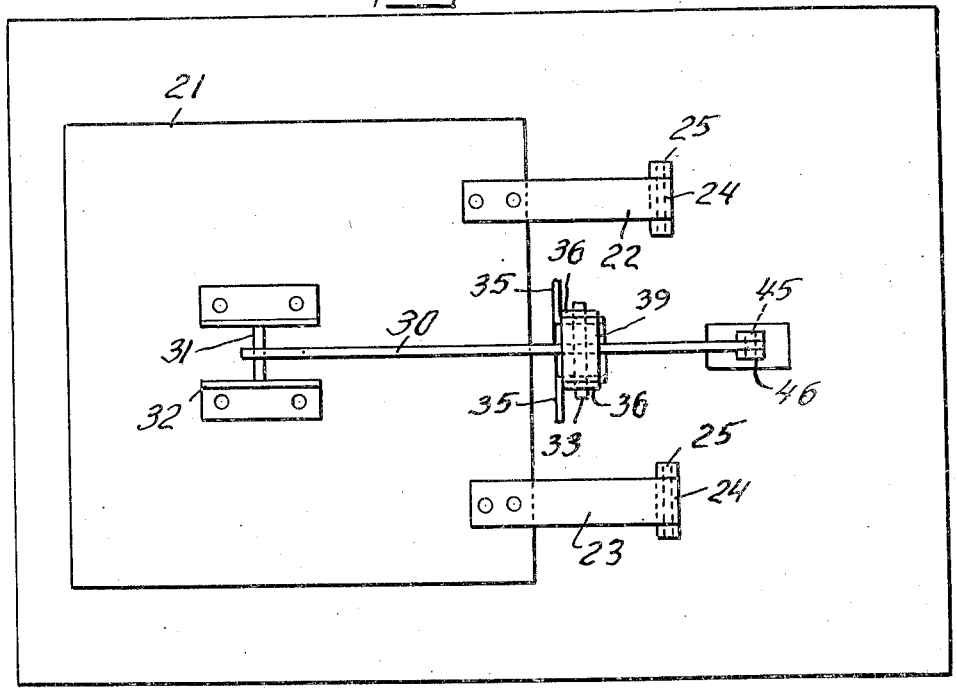
Fig. 2 is a top plan view of the construction shown in Fig. 1.
Figure 3:
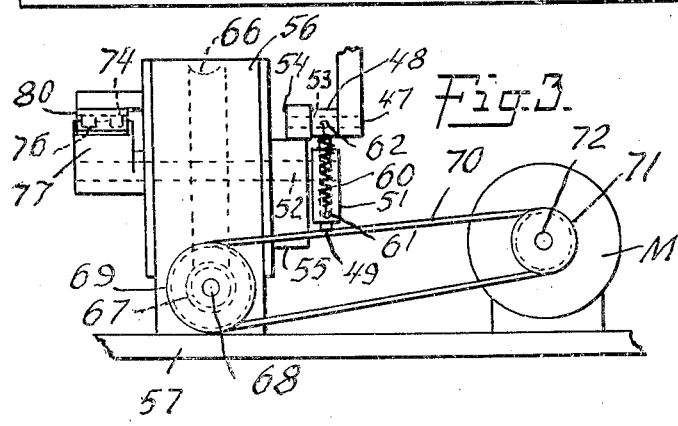
Fig. 3 is a detail elevational view illustrating the connections between the motor and the link for operating the platen through a lever connection.

The invention briefly described consists of photoprinting apparatus comprising a cabinet having a glass for supporting the negative and sensitized paper and for transmitting the light to the negative, a platen hinged to the top of the cabinet and adapted to move into cooperative relation with the glass plate and to clamp the negative and sensitized paper between the platen and the plate and operating mechanism for the platen. The operating mechanism for the platen is constructed and arranged to move the platen into operative relation to the glass plate and to firmly and securely hold the sensitized paper and negative in position during the printing operation and thereafter to release the platen and move it to inoperative position. This operative mechanism also includes means for automatically opening the lamp circuit at a predetermined time in the cycle of operation of the mechanism. The platen operating means includes a lever and in order to release the platen in case of need, as, for instance, if the fingers of the operator were caught between the platen and the top of the cabinet or glass plate, means is provided for manually releasing the fulcrum of the lever which controls the movement of the platen. Further details of the invention will appear from the following description.

In the particular embodiment of the invention illustrated in the drawings, there is shown a cabinet 10 which is preferably supported on legs 11 and is provided with chambers 12 and 13 separated by a partition 14. The chamber 13 has mounted therein a plurality of lamps 15 and a glass plate, preferably of translucent or opal glass 16, is mounted in the chamber 13 between the lamps 15 and an opening 17 in the top of the cabinet in which opening is mounted a plate 18, preferably of transparent glass.

It will be understood that in the printing operation the negative and sensitized paper are positioned on the glass plate 18 with the negative disposed against the outer surface of the plate and the sensitized face of the paper disposed against the negative.

In order to hold the negative and sensitized paper firmly and immovably in position against the plate 18 during the printing operation, a platen 20, preferably of cushioning material, such, for instance, as that shown in my Patent No. 2,200,719, is mounted on the bottom of a frame or support 21. The platen frame 21 has a pair of arms 22 and 23 extending rearwardly therefrom and pivoted at 24 to brackets 25 which are secured to the upper surface of the cabinet and extend upwardly therefrom.

The platen or platen frame 21 is raised and lowered about the pivot 24 by means of a lever 30 which is connected at its forward end by a pin and slot connection 31 to a block 32 mounted on the platen frame 21. The lever 30 has a fulcrum 33 intermediate its ends, the fulcrum 33 being mounted in slots 34 in a pair of vertically extending supporting posts 35 which extend above the top of the cabinet 10 and also extend downwardly into the chamber 12, as shown in Fig. 1. The fulcrum 33 is held in fixed position in the slots 34 by means of a pair of arms 36 which are pivoted at 37 to the vertical posts 35 and are provided with alined notches 38 which are adapted to receive the outer ends of the fulcrum pin 33 and to clamp the pin in the notches 34, as shown in Fig. 1. The upper ends of the arms 37 are connected by a handle or cross bar 39.

In case the hand of the opertor is caught between the platen and the top of the cabinet or glass plate 18, the operator with his other hand can quickly push rearwardly on the handle 39 or arms 36 and release the fulcrum pin 33 from the notches 38, permitting the lever to move upwardly, as shown in Fig. 5, and thus release the hand of the operator.

The lever 30 is operated in the following manner. The rear end of the lever is pivoted at 45 to the upper end of a link or pitman 46 and the lower end of the link or pitman 46 is pivoted at 47 to a block 48. The block 48 has secured thereto and extending therefrom, a pair of pins or posts 49 and 50. These pins or posts are slidably mounted in the block 51 which is fixed to and rotates with a shaft 52. The lower end of the link 46 is pivoted at 47 to the block 48 by means of a pin 53 which extends through the block 48. On the other end of the pin 53 there is mounted a roller 54 which is positioned in engagement with the outer surface of a cam 55 which is fixed to a casing 56 supported on the base 57 of the chamber 12. The roller 54 is held in engagement with the cam by means of a pair of springs 60 which are connected at 61 to the block 51 and are connected to lugs 62 which are carried by and extend beyond the ends of the block 48.

The cam 55 has on the upper surface thereof a substantially flat but slightly arcuate cam surface 65, the radius of curvature of the surface 65 being equal to the distance between the pivot 45 and the axis of the pin 53. In the particular cam shown, the cycle is so arranged that the platen is held in operative position or in the position shown in Fig. 1 during approximately one-third of the cycle of operation of the platen or one-third of the revolution of the roller 54 around the periphery of the cam 55. The other two-thirds of the cycle are taken in lowering the platen to operative position from the dot and dash line shown in Fig. 1 and in returning the platen to its initial or inoperative position.

The shaft 52 has mounted thereon a worm gear 66 which meshes with a worm 67 mounted on a shaft 68 having a pulley 69 also secured thereto. The pulley 69 is driven by a belt 70 from a pulley 71 mounted on the shaft 72 of a motor M supported on the base of the chamber 12.

Figure 6:
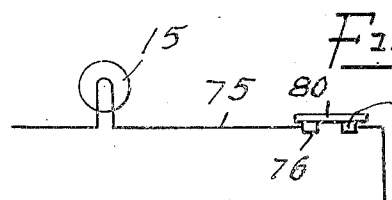
Fig. 6 is a diagrammatic view illustrating the lamp circuit.

The lamp circuit of the lamps 15 is preferably so controlled that when the platen is moved to full operative position the circuit will be closed and when the platen is released from operative position the circuit will be opened. This can be accomplished in various ways and in the particular form of the invention shown there is illustrated in Fig. 6 a lamp circuit in which one wire 73 leads to a contact 74 and the other wire 75 having a lamp 15 connected thereto leads to a contact 76. The contacts 74 and 76 are disposed on an arm 77 which is secured to one end of the shaft 52 and rotates therewith. These contacts are bridged by an arcuate conducting bar 80 which is fixed to the casing 56 and is dosposed in such a position that when the roller 54 engages the portion 65 of the cam 55, the contacts 74 and 76 will engage the bar 80 of conducting material and the circuit will be completed through this bar and through the lamps. However, after the roller 54 has moved across the portion 65 of the cam 55 and leaves this portion, the contacts 74 and 76 will move out of engagement with the bar 80, thereby opening the lamp circuit.

*Operation*

The platen control and operating mechanism may be briefly summarized as follows. When the motor M is started, the block 51 will be rotated with the shaft 52, thereby through the pins 49 and 50 causing the block 48 to rotate about the axis of the shaft 52. The movement of the block 48, pivot pin 53, and lower end of the link 46 will be controlled by the movement of the roller 54 around the periphery of the cam 55, which is stationary. This movement, as above described, will be communicated to the lever 30 since the link 46 extends upwardly through an opening in the top of the cabinet and is pivoted at 45 to the rear end of the lever 30. Thus, during the cycle of operation, the lever will be moved downwardly from the dot and dash line position shown in Fig. 1 to the full line position, will be maintained in the full line position, firmly holding the negative and print paper against the glass plate 18 during approximately one-third of the cycle, and thereafter will return to its initial or elevated position. In case of need the platen can be released by pushing rearwardly on the handle 39 or arms 36, thereby releasing the fulcrum pin 33 and permitting the platen frame to move upwardly.

During the cycle of operation of the platen, the lamps 15 will be controlled in their operation by the movement of the contacts 74 and 76 in engagement with the conducting bar 80 as the contacts move around with the arm 77 about the axis of the shaft 52. Thus the lamps will be automatically lighted when the platen has been moved to operative position and will be automatically extinguished when the platen is released from operative position.

From the foregoing specification it will be clear that after the motor is started the operation of the machine is entirely automatic. The speed of operation and division of the cycle by the cam are such that the operator has ample time to place the negative and print paper on the glass support and to withdraw them after the printing portion of the cycle has been completed.

Moreover, during the printing operation the negative and print papers are positively held against the plate by absolutely uniform pressure.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. In photoprinting apparatus, a support for the negative and sensitized paper, a platen mounted to move toward and away from said support to engage and press the paper and negative against said support, and means for positively actuating said platen toward and away from said support, said means including a fixed cam, a link controlled by the cam, a roller on the lower end portion of the link engaging the cam, resilient means for holding the roller in contact with the cam, a lever pivoted to the link and to the platen, said cam, link and lever being so designed as to move the platen toward the support and into pressing position, hold the platen immovable in its pressing position at a constant uniform pressure for a predetermined time, and release and move the platen away from the support to inoperative position in each cycle of operation and manually controlled releasable means associated with the lever fulcrum for releasing the lever fulcrum and lever from its normal operation.

2. In photoprinting apparatus, a support for the negative and sensitized paper, a platen mounted to move toward and away from said support to engage and press the paper and negative against said support, and means for positively actuating said platen toward and away from said support, said means including a fixed cam, a link controlled by the cam, a roller on the lower end portion of the link engaging the cam, resilient means for holding the roller in contact with the cam, a lever pivoted to the link and to the platen, said cam, link and lever being so designed as to move the platen toward the support and into pressing position, hold the platen immovable in its pressing position at a constant uniform pressure for a predetermined time, and release and move the platen away from the support to inoperative position in each cycle of operation, the upper surface of said cam being substantially flat but conforming to an arc having as a radius substantially the distance from the pivot between the link and lever to the lower periphery of the roller and manually controlled releasable means associated with the lever fulcrum for releasing the lever fulcrum and lever from its normal operation.

WILBERT H. MORGAN.

REFERENCES CITED

The following references are of record in the file of this patent:

UNITED STATES PATENTS

| Number | Name | Date |
| --- | --- | --- |
| 1,473,740 | Sankey | Nov. 13, 1923 |
| 1,510,715 | Sturchfield | Oct. 7, 1924 |
| 1,783,953 | Briggs | Dec. 9, 1930 |
| 2,100,087 | Priou | Nov. 23, 1937 |